United States Patent
Li et al.

(10) Patent No.: US 9,736,529 B2
(45) Date of Patent: Aug. 15, 2017

(54) USB SHARING METHOD FOR COMBO TV SET, COMBO TV SET AND COMPUTER READABLE STORAGE MEDIUM

(71) Applicant: Hisense Hiview Tech Co., Ltd., Qingdao (CN)

(72) Inventors: Lei Li, Qingdao (CN); Jintong Wang, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 14/717,043

(22) Filed: May 20, 2015

(65) Prior Publication Data

US 2016/0127768 A1 May 5, 2016

(30) Foreign Application Priority Data

Oct. 30, 2014 (CN) .......................... 2014 1 0598378

(51) Int. Cl.
| | |
|---|---|
| H04N 7/173 | (2011.01) |
| H04N 21/436 | (2011.01) |
| G06F 13/38 | (2006.01) |
| H04N 21/443 | (2011.01) |
| H04N 5/268 | (2006.01) |
| H04N 21/41 | (2011.01) |

(52) U.S. Cl.
CPC ..... *H04N 21/43615* (2013.01); *G06F 13/385* (2013.01); *H04N 5/268* (2013.01); *H04N 21/443* (2013.01); *H04N 21/41* (2013.01)

(58) Field of Classification Search
CPC ....................................................... H04N 21/41
USPC ........................................................ 725/133
See application file for complete search history.

(56) References Cited

U.S. PATENT DOCUMENTS

2007/0016714 A1* 1/2007 Huotari .................. H04L 67/34
710/313
2014/0297905 A1* 10/2014 Wang ...................... G06F 13/42
710/48

FOREIGN PATENT DOCUMENTS

| CN | 101056400 A | 10/2007 |
| CN | 102654792 A | 9/2012 |
| CN | 202587259 U | 12/2012 |

(Continued)

*Primary Examiner* — Michael Hong
(74) *Attorney, Agent, or Firm* — Harness, Dickey & Pierce, P.L.C.

(57) ABSTRACT

A USB sharing method for a combo TV set, a combo TV set and a computer readable storage medium are disclosed. The USB sharing method includes: receiving, by a host, a data packet transmitted via a first USB interface by a first USB device; parsing the data packet and obtaining an interface identifier of the first USB interface in the data packet; switching the first USB interface to a first intelligent component corresponding to the first USB interface according to the interface identifier of the first USB interface; and transmitting a USB request to the first intelligent component over a network channel between the host and the first intelligent component, so that the first intelligent component loads a corresponding USB device driver according to a device identifier of the first USB device included in the USB request to identify the first USB device.

20 Claims, 5 Drawing Sheets

(56) References Cited

FOREIGN PATENT DOCUMENTS

CN  103546704 A  1/2014
WO  WO-2014158652 A1  10/2014

* cited by examiner

USB SHARING METHOD FOR COMBO TV SET, COMBO TV SET AND COMPUTER READABLE STORAGE MEDIUM

CROSS-REFERENCE TO RELATED APPLICATION

This application claims the benefit and priority of Chinese Patent Application No. 201410598378.6 filed Oct. 30, 2014. The entire disclosure of the above application is incorporated herein by reference.

FIELD

The present disclosure relates to the field of TV sets and particularly to a USB sharing method for a combo TV set, a combo TV set and a computer readable storage medium.

BACKGROUND

This section provides background information related to the present disclosure which is not necessarily prior art.

In recent years, various digital home appliances used by people in their life at home may be interconnected and communicate over a home network due to emerging digitalization at home, so that information may be shared and the devices may be controlled through the home network platform. TV sets are such important digital home appliances in the life at home that people have a growing demand for digitalization and intelligence of the TV sets. A number of external digital devices applicable to the TV sets have emerged in the current field of digital TV sets, e.g., high-definition network set-top boxes, intelligent TV boxes, TV cards, etc., and it has become a predominant trend to operate to connect these external digital devices to a digital TV set through a routing device, so a combo TV set has been proposed by those skilled in the art to accommodate this predominant trend.

The combo TV set refers to a TV set where a plurality of external digital devices which are intelligent modules (that is, these external digital devices will not exist as set-top boxes but instead be installed directly inside the combo TV set) are connected with the host of the digital TV set through a network routing module. In the prior art, a typical combo TV set architecture includes a host of the digital TV set and a plurality of intelligent modules, and the host is provided thereon with a plurality of Universal Serial Bus (USB) interfaces configured to be connected with various USB devices, e.g., a mouse, a keyboard, a U-disk, etc. and the intelligent modules are connected with the host through a network routing module in the combo TV set.

SUMMARY

This section provides a general summary of the disclosure, and is not a comprehensive disclosure of its full scope or all of its features.

Some embodiments of the disclosure provide a USB sharing method for a combo TV set, where the combo TV set includes a host, and at least one intelligent component connected with the host over a network channel, and the host including at least one USB interface configured to be connected with a USB device, the method including:

receiving, by the host, a data packet transmitted via a first USB interface by a first USB device;

parsing the data packet and obtaining an interface identifier of the first USB interface in the data packet;

switching the first USB interface to a first intelligent component corresponding to the first USB interface according to the interface identifier of the first USB interface; and transmitting a USB request to the first intelligent component over a network channel between the host and the first intelligent component, so that the first intelligent component loads a corresponding USB device driver according to a device identifier of the first USB device included in the USB request to identify the first USB device.

Some embodiments of the disclosure provide a combo TV set. The combo TV set includes a host, and at least one intelligent component connected with the host over a network channel, and the host including at least one USB interface configured to be connected with a USB device, wherein the host includes a memory and one or more processors, the memory stores one or more computer readable program codes, and the one or more processors are configured to execute the one or more computer readable program codes to:

receive a data packet transmitted via a first USB interface by a first USB device;

parse the data packet and obtain an interface identifier of the first USB interface in the data packet;

switch the first USB interface to a first intelligent component corresponding to the first USB interface according to the interface identifier of the first USB interface; and transmit a USB request to the first intelligent component over a network channel between the host and the first intelligent component, so that the first intelligent component loads a corresponding USB device driver according to a device identifier of the first USB device included in the USB request to identify the first USB device.

Some embodiments of the disclosure provide a computer readable storage medium, where the computer readable storage medium is applicable to a combo TV set including a host, and at least one intelligent component connected with the host over a network channel, and the host including at least one USB interface configured to be connected with a USB device, wherein the computer readable storage medium stores thereon instruction codes executed to cause the host to perform at least the operations of:

receiving a data packet transmitted via a first USB interface by a first USB device;

parsing the data packet and obtaining an interface identifier of the first USB interface in the data packet;

switching the first USB interface to a first intelligent component corresponding to the first USB interface according to the interface identifier of the first USB interface; and transmitting a USB request to the first intelligent component over a network channel between the host and the first intelligent component, so that the first intelligent component loads a corresponding USB device driver according to a device identifier of the first USB device included in the USB request to identify the first USB device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In the existing combo TV set, respective intelligent modules and the host of the TV set are independent from each other, thus only the host of the combo TV set may directly access and control the USB device connected with the host through the USB interface, while the intelligent module of the combo TV set couldn't directly access the USB device connected with the host. Therefore, information can't be shared in the combo TV set and the utilization ratio of the USB device in the existing combo TV set is low.

The technical solutions according to some embodiments of the disclosure will be described below with reference to the drawings in the embodiments of the disclosure, and apparently the embodiments described below are only a part but not all of the embodiments of the disclosure. All the other embodiments which may occur to those ordinarily skilled in the art based upon the embodiments here of the disclosure without any inventive effort shall fall into the scope of the disclosure.

Figure 1:
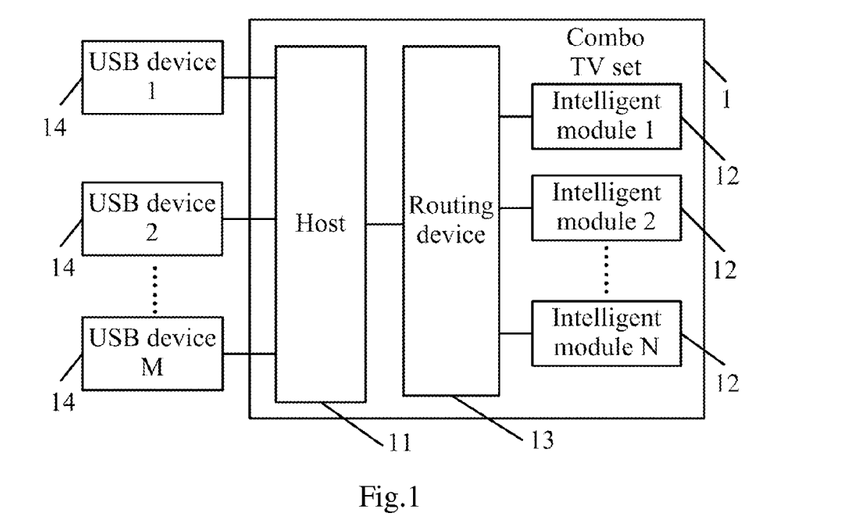
FIG. 1 illustrates a schematic structural diagram of a combo TV set according to an embodiment of the disclosure.

FIG. 1 illustrates a combo TV set architecture applicable to some embodiments of the disclosure. The combo TV set 1 may include a host 11, at least one intelligent module 12 (an intelligent module 1, an intelligent module 2, . . . , and an intelligent module N as illustrated in FIG. 1), and a routing device 13 configured to connect the host 11 and the intelligent module 12 (that is, the host 11 and the intelligent module 112 may be connected over a network channel). In some embodiments, the host 11 may include at least one Universal Serial Bus (USB) interface configured to be connected with at least one USB device 14 (a USB device 1, a USB device 2, . . . , and a USB device M as illustrated in FIG. 1), the USB device 14 may include a U-disk, a mouse, a keyboard, a smart phone, a mobile hard disk, a touch pad, a microphone, a speaker, a display screen and other digital devices provided with USB interfaces. The intelligent module 12 in the combo TV set may be an external digital device applicable to the TV set, e.g., a network set-top box, a TV card, an intelligent TV box or other digital devices which may access the Internet. In the present disclosure, such external devices will not exist as set-top boxes but instead be installed inside the combo TV sets as respective modules of the combo TV sets.

Figure 2:
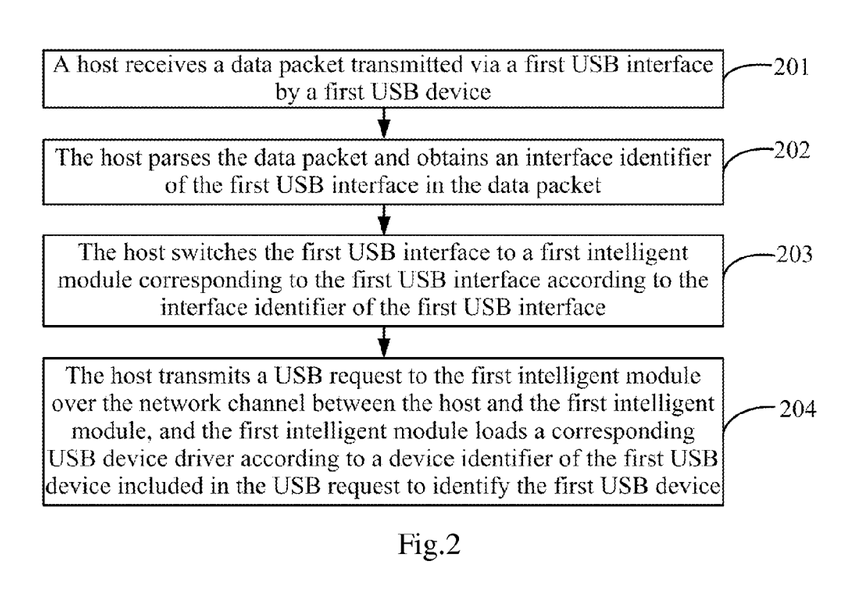
FIG. 2 illustrates a schematic flow chart of a USB sharing method for a combo TV set according to an embodiment of the disclosure.

Some embodiments of the disclosure provide a USB sharing method for a combo TV set, as illustrated in FIG. 2, which may include the following operations:

201. A host receives a data packet transmitted via a first USB interface by a first USB device.

The data packet may include an interface identifier of the first USB interface, and a device identifier of the first USB device. The interface identifier of the USB interface may be configured to distinguish the respective USB interfaces of the host of the combo TV set, and the device identifier of the first USB device may configured to identify a device type of the first USB device, which may be a file system, an input system, an output system, etc.

In one embodiment, the interface identifier of the first USB interface may be an interface number of the first USB interface, e.g., USB-1, or may be identification information of the first USB interface, e.g., USB-II. The interface identifier of the USB interface is information which may identify uniquely the corresponding USB interface. When the device type of the first USB device is a file system, the first USB device may be a smart phone, a U-disk, a mobile hard disk or another device with a storage function; when the device type of the first USB device is an input system, the first USB device may be a mouse, a keyboard, a touch pad, a microphone or another input device; and when the device type of the first USB device is an output system, the first USB device may be a speaker, a display screen or another output device.

202. The host parses the data packet and obtains an interface identifier of the first USB interface in the data packet.

203. The host switches the first USB interface to a first intelligent module corresponding to the first USB interface according to the interface identifier of the first USB interface.

For example the host may select an intelligent module according to instruction information, or select a default intelligent module, as the first intelligent module, establish a network channel between the host and the first intelligent module, make the host and the intelligent module ready respectively for a virtual driver to be enabled, and switch a soft switch in the driver to the current network channel between the host and the first intelligent module and then close the switch to switch the first USB interface to the first intelligent module, that is, switch an address of the first USB interface in the host to the first intelligent module and associate the address of the first USB interface in the host with an address of the first intelligent module.

In one embodiment, if the host of the combo TV set receives instruction information transmitted by a user or instruction information transmitted by some intelligent module in the combo TV set, then the host may switch the first USB interface to the first intelligent module indicated by the received instruction information according to the instruction information. If the host of the combo TV set does not receive any instruction, since the host being powered on will choose to access some intelligent module, that is, the host will have a network channel established with the intelligent module, then the host may determine the intelligent module directly as the first intelligent module and switch the first USB interface to the first intelligent module. However, if the host currently accesses an intelligent module which is handling some USB interface, since each intelligent module may only identify one USB interface at a time, then the host may select another idle intelligent module as the first intelligent module and switch the first USB interface to the first intelligent module.

204. The host transmits a USB request to the first intelligent module over the network channel between the host and the first intelligent module, and the first intelligent module loads a corresponding USB device driver according to a device identifier of the first USB device included in the USB request to identify the first USB device.

For example, after the host parses the data packet for the interface identifier of the first USB interface, the host may then package the remaining data again into a new data packet and carry the data packet in the USB request transmitted to the first intelligent module over the network channel between the host and the first intelligent module. The first intelligent module parses the new data packet, and may then obtain the device identifier of the first USB device included in the new data packet and search a pre-stored driver file for the USB device driver corresponding to the device identifier of the first USB device according to the device identifier, to identify the first USB device.

In the USB sharing method for a combo TV set according to some embodiments of the disclosure, the host receives the data packet transmitted via the first USB interface by the first USB device, parses the data packet and obtains the interface identifier of the first USB interface in the data packet, and switches the first USB interface to the first intelligent module corresponding to the first USB interface according to the interface identifier of the first USB interface, and then the host transmits the USB request to the first intelligent module over the network channel between the host and the first intelligent module. The first intelligent module loads the corresponding USB device driver according to the device identifier of the first USB device included in the USB request to identify the first intelligent module, so that the USB device information may be shared in the combo TV set; and as compared with the prior art where the intelligent module in the combo TV set may not access directly the USB device connected with the host of the combo TV set, the process above of the present disclosure enables the intelligent module in the combo TV set to access successfully the USB device connected via the USB interface of the host to thereby improve the utilization ratio of the USB device and further satisfy a demand for sharing digitalized devices at home.

Figure 3:
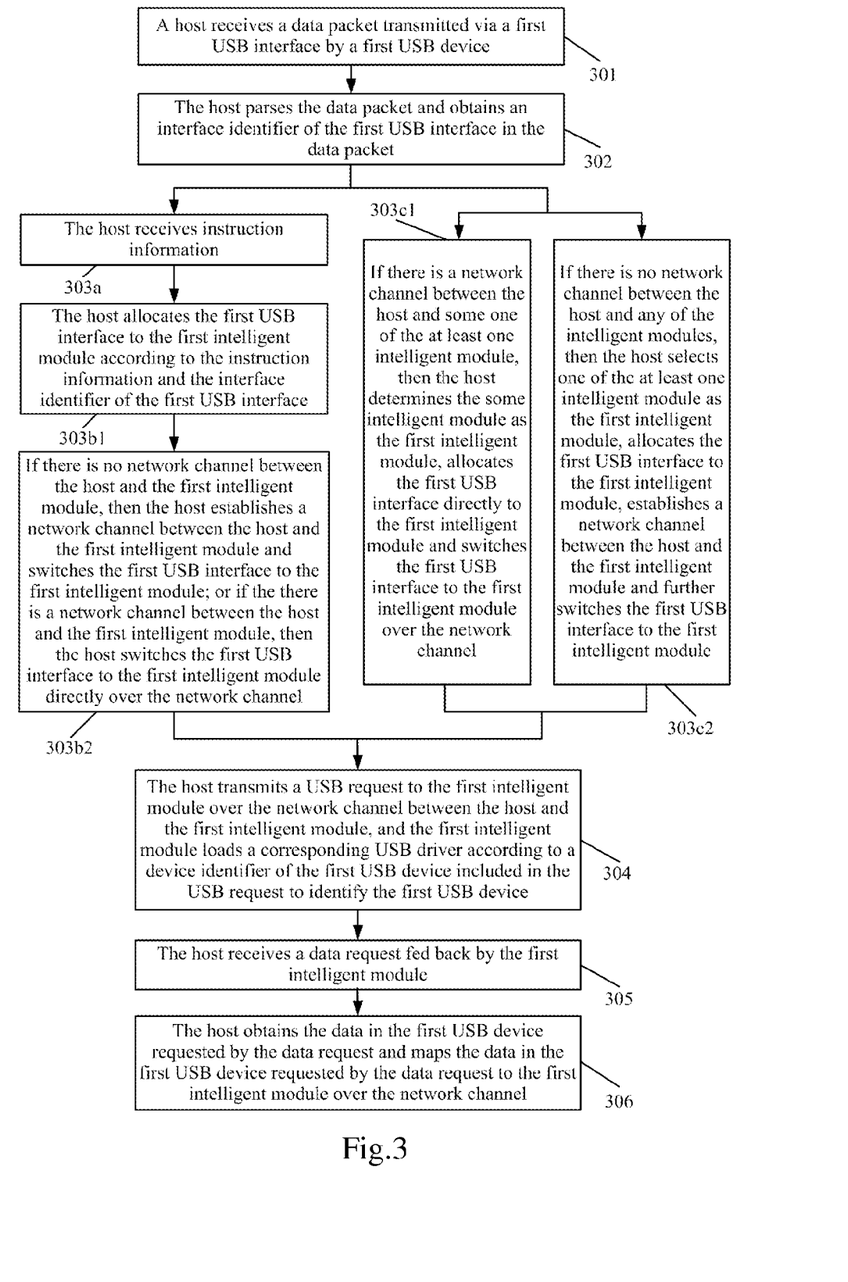
FIG. 3 illustrates a schematic flow chart of another USB sharing method for a combo TV set according to an embodiment of the disclosure.

Some embodiments of the disclosure provide another USB sharing method for a combo TV set, as illustrated in FIG. 3, which may include the following operations:

301. A host receives a data packet transmitted via a first USB interface by a first USB device.

302. The host parses the data packet and obtains an interface identifier of the first USB interface in the data packet.

Reference may be made to the description of the operations 201 and 202 in the corresponding embodiment in FIG. 2 for a description of the operations 301 and 302, so a repeated description thereof will be omitted here.

303. The host switches the first USB interface to a first intelligent module corresponding to the first USB interface according to the interface identifier of the first USB interface.

The host may switch the first USB interface to the first intelligent module corresponding to the first USB interface in two implementations. When the host receives instruction information to instruct the host to switch the first USB interface to some intelligent module, the host may switch the first USB interface in a first implementation; and when the host does not receive any instruction information to instruct the host to switch the first USB interface to some intelligent module, the host may switch the first USB interface in a second implementation.

The first implementation may be as follows:

Optionally the method may further include the following operations before the operation 303:

303*a*. The host receives instruction information.

The instruction information may instruct the host to allocate the first USB interface to the first intelligent module. The instruction information may be a user instruction input by a user through a remote controller, a microphone, a PAD or another input device, or the instruction information may be a request instruction transmitted by the first intelligent module being triggered when the first USB device is inserted into the first USB interface. By way of an example, when the user inserts a U-disk into the USB interface of the combo TV set, the user may generate the user instruction, by operating a remote controller, to instruct the host of the combo TV set to allocate the USB interface, into which the U-disk is inserted, to the intelligent module 1.

Furthermore the operation 303 may include the following operations based upon the operation 303*a*:

303*b*1. The host allocates the first USB interface to the first intelligent module according to the instruction information and the interface identifier of the first USB interface.

303*b*2. If there is no network channel between the host and the first intelligent module, then the host may firstly establish a network channel between the host and the first intelligent module and switch the first USB interface to the first intelligent module; or if the there is a network channel between the host and the first intelligent module, then the host switches the first USB interface to the first intelligent module directly over the network channel.

By way of an example, the host may switch the first USB interface to the first intelligent module according to the instruction information in the following three implementations: 1. if there is a network channel between the host and a second intelligent module (the second intelligent is another intelligent module than the first intelligent module indicated by the instruction information), that is, there is no network channel between the host and the first intelligent module indicated by the instruction information, then the host may establish a network channel between the host and the first intelligent module and further switch the first USB interface to the first intelligent module; 2. If there is a network channel between the host and the first intelligent module, then the host may switch the first USB interface to the first intelligent module directly over the network channel; and 3. if there is no network channel between the host and any of the intelligent modules in the combo TV set, then the host may establish a network channel between the host and the first intelligent module and further switch the first USB interface to the first intelligent module.

It shall be noted that if the first intelligent module is handling another USB interface when the first USB device is inserted into the first USB interface, since each intelligent module may only identify one USB interface at a time, then the host may select another idle intelligent module and establish a network channel between the host and the other idle intelligent module and then switch the first USB interface to the intelligent module.

A second implementation may be as follows:

Optionally the operation 303 may include the following operations:

303*c*1. If there is a network channel between the host and some one of the at least one intelligent module, then the host may determine the some one intelligent module as the first intelligent module, allocate the first USB interface directly to the first intelligent module and switch the first USB interface to the first intelligent module over the network channel.

Or,

303c2. If there is no network channel between the host and any of the intelligent modules, then the host may select one of the at least one intelligent module as the first intelligent module, allocate the first USB interface to the first intelligent module, establish a network channel between the host and the first intelligent module and further switch the first USB interface to the first intelligent module.

By way of an example, the host receiving no instruction information may select one of the at least one intelligent module as the first intelligent module particularly in the following three implementation: 1. the host may select an intelligent module with a higher priority as the first intelligent module according to priorities of the respective intelligent modules and allocate the first USB interface to the first intelligent module and then establish a network channel between the host and the first intelligent module and switch the first USB interface to the first intelligent module; 2. the host may select any one of the respective idle intelligent module as the first intelligent module and then establish a network channel between the host and the first intelligent module and switch the first USB interface to the first intelligent module; and 3. if the host is currently connected with some intelligent module, then the host may switch the first USB interface to the first intelligent module directly over a network channel active between the host and the intelligent module.

It shall be noted that when the host is powered on or before the first USB device is inserted into the first USB interface, the host may establish the network channel between the first intelligent module and the host in response to a user instruction or according to instruction information transmitted by the first intelligent module.

304. The host transmits a USB request to the first intelligent module over the network channel between the host and the first intelligent module, and the first intelligent module may load a corresponding USB device driver according to a device identifier of the first USB device included in the USB request to identify the first USB device.

Optionally the method may further include the following operations after the operation 304:

305. The host receives a data request fed back by the first intelligent module.

The data request may request for data in the first USB device from the host.

306. The host obtains the data in the first USB device requested by the data request and maps the data in the first USB device requested by the data request to the first intelligent module over the network channel.

After the first USB device is identified normally, the first intelligent module may continuously transmit the data request to the host over the network channel between the host and the first intelligent module in response to a demand of an application in the first intelligent module, the host receiving the data request will parse the data request and pass them to the corresponding first USB interface, and the first USB interface will obtain the data requested by the data request from the first USB device.

In the sharing USB method for combo TV set provided by one or more embodiments, the USB device information may be shared in the combo TV set. As compared with the prior art where the intelligent module in the combo TV set may not access directly the USB device connected with the host of the combo TV set, the process above of the present disclosure enables the intelligent module in the combo TV set to access successfully the USB device connected via the USB interface of the host to thereby improve the utilization ratio of the USB device and further satisfy a demand for sharing digitalized devices at home.

By way of an example, an application of the second embodiment to the combo TV set illustrated in FIG. 1 will be described here:

Referring to FIG. 1 illustrating a schematic structural diagram of the combo TV set, the USB device connected to the host of the combo TV set is a U-disk, for example, and before the user inserts the U-disk into the host, the host has allocated the USB interface connected with the U-disk to the intelligent module 1 (that is, there is a network channel established between the host and the intelligent module 1, the host and the intelligent module 1 are made ready respectively for the virtual driver to be enabled, and also the soft switch in the driver is switched to the network channel between the host and the intelligent module 1), so the method according to the embodiment of the disclosure may be performed as follows:

In the combo TV set, when the U-disk accesses the host via the USB-1 interface of the host, the USB-1 interface of the host may trigger the host to drive the USB (that is, load a driver file USB_core.ko) to obtain the interface number USB-1 and to switch the USB-1 interface to the intelligent module according to the interface number. Then the virtual driver of the host (i.e., a loaded driver file Host.ko) may transmit data including the device information of the U-disk to the intelligent module 1 over the network channel between the intelligent module 1 and the host, and a USB Virtual Host Control Driver (VHCD) of the intelligent module 1 may parse the data, selects a corresponding U-disk device driver file (USB_storage.ko) according to the device information (File System) of the U-disk and loads the U-disk driver to thereby identify the U-disk, that is, /dev/sda* may be viewed under a corresponding directory of the intelligent module 1 on the screen of the combo TV set, that is, the intelligent module 1 may access directly the U-disk inserted on the host. If the user is going to watch a video stored in the U-disk, then the intelligent module 1 will instruct a corresponding application process, in response to a user instruction, to read a video file stored in the U-disk, and at this time the virtual driver in the intelligent module 1 will package and transmit an operation instruction to be executed by the U-disk to the host. The host receiving the instruction packet invokes the USB device driver to parse the instruction packet and transmits the operation instruction as a result of parsing to the U-disk via the USB-1 interface, the U-disk operates accordingly and feeds data of the video back to the host, the host further packages the data of the video into a data packet and transmits the data packet to the intelligent module 1 over the network channel, and finally the intelligent module 1 parses the data packet and transports the data of the video to a corresponding application.

In the USB sharing method for a combo TV set according to some embodiments of the disclosure, the host receives the data packet transmitted via the first USB interface by the first USB device, parses the data packet and obtains the interface identifier of the first USB interface in the data packet, and switches the first USB interface to the first intelligent module corresponding to the first USB interface according to the interface identifier of the first USB interface, and then the host transmits the USB request to the first intelligent module over the network channel between the host and the first intelligent module, and the first intelligent module loads the corresponding USB device driver according to the device identifier of the first USB device included in the USB request to identify the first intelligent module, so that the USB device information may be shared in the combo TV set; and as compared with the prior art where the intelligent module in the combo TV set may not access directly the USB device connected with the host in the combo TV set, the process of the present disclosure above enables the intelligent module in the combo TV set to access successfully the USB device connected via the USB interface on the host to thereby improve the utilization ratio of the USB device and further satisfy a demand for sharing digitalized devices at home.

Figure 4:
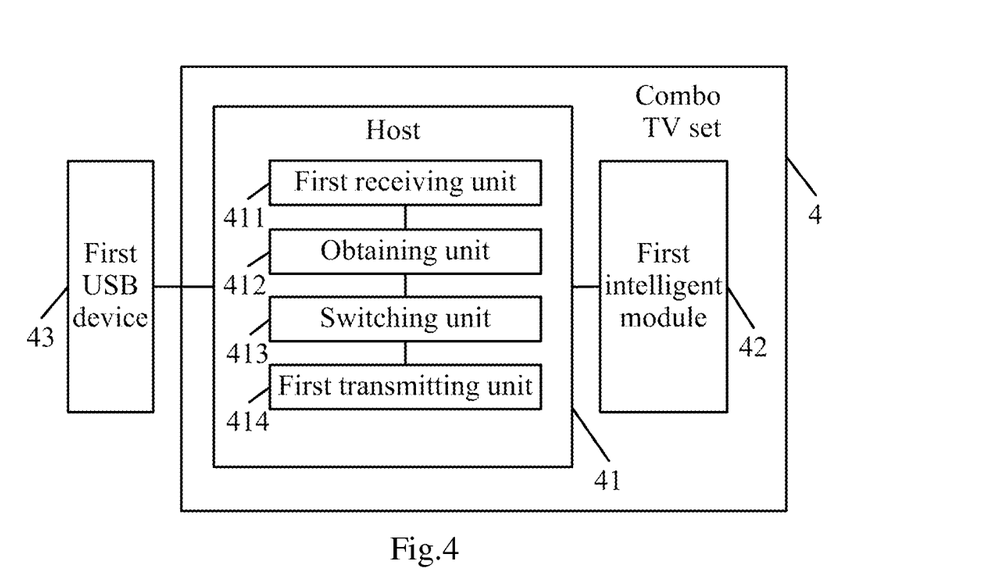
FIG. 4 illustrates a schematic structural diagram of a combo TV set according to an embodiment of the disclosure.

Some embodiments of the disclosure further provide a combo TV set 4. As illustrated in FIG. 4, the combo TV set 4 may include a host 41, and at least one intelligent module 42 connected with the host over a network channel, and the host 41 may include at least one USB interface, the USB interface is configured to be connected with the USB device 43. When a first USB device 43 accesses the host via the first USB interface of the host, the host 41 may include a first receiving unit 411, an obtaining unit 412, a switching unit 413 and a first transmitting unit 414.

The first receiving unit 411 may be configured to receive a data packet transmitted via a first USB interface by a first USB device 43.

The obtaining unit 412 may be configured to parse the data packet received by the first receiving unit 411 and obtain an interface identifier of the first USB interface in the data packet.

The switching unit 413 may be configured to switch the first USB interface to a first intelligent module 42 corresponding to the first USB interface according to the interface identifier of the first USB interface obtained by the obtaining unit 412.

The first transmitting unit 414 may be configured to transmit a USB request to the first intelligent module 42 over a network channel between the host 41 and the first intelligent module 42, so that the first intelligent module 42 loads a corresponding USB device driver according to a device identifier of the first USB device 43 included in the USB request to identify the first USB device 43.

The interface identifier of the first USB interface may include an interface number of the first USB interface; and the device identifier of the first USB device 43 may configured to identify a device type of the first USB device 43, which may include a file system, an input system or an output system.

Figure 5:
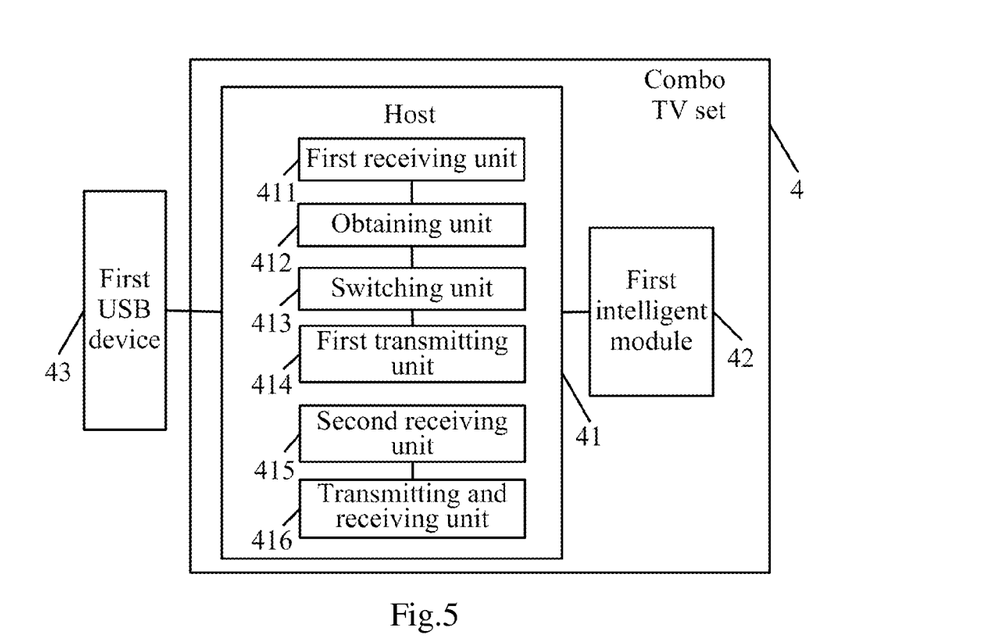
FIG. 5 illustrates a schematic structural diagram of another combo TV set according to an embodiment of the disclosure.

Optionally as illustrated in FIG. 5, the host 41 may further include a second receiving unit 415 and a transmitting and receiving unit 416.

The second receiving unit 415 is configured to receive a data request fed back by the first intelligent module 42 to request data in the first USB device 43 from the host.

The transmitting and receiving unit 416 is configured to obtain the data in the first USB device 43 requested by the data request received by the second receiving unit 415 and to map the data in the first USB device 43 requested by the data request to the first intelligent module 42 over the network channel.

Figure 6:
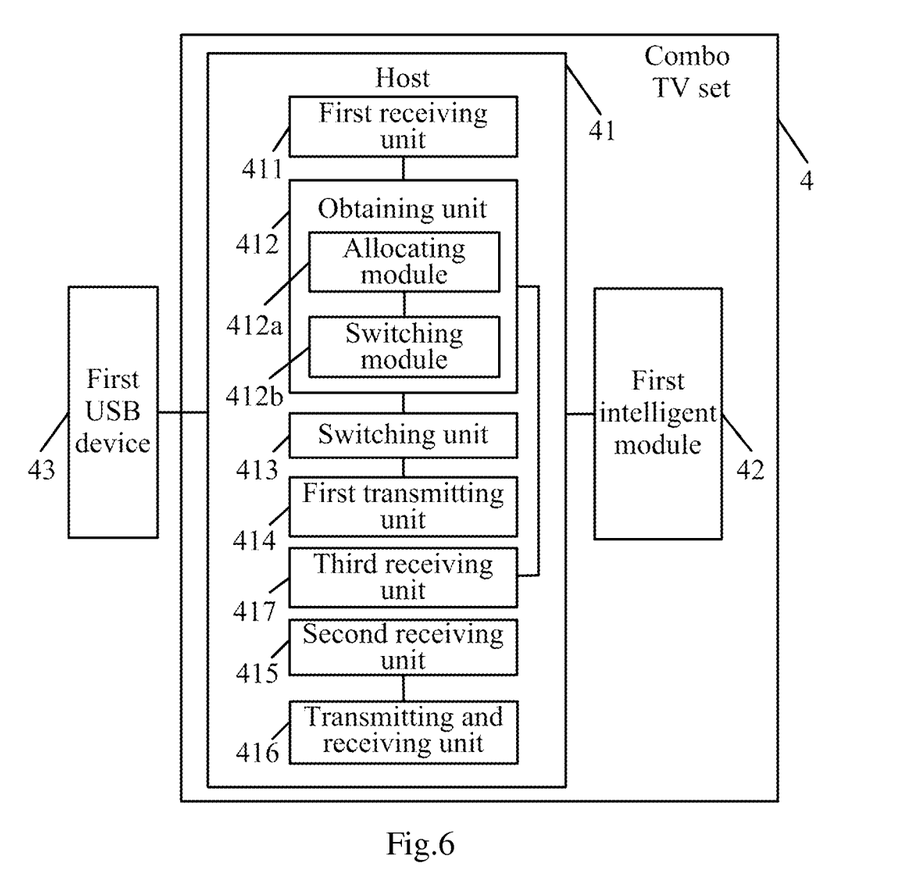
FIG. 6 illustrates a schematic structural diagram of another combo TV set according to an embodiment of the disclosure.

Optionally as illustrated in FIG. 6, the host 41 may further include a third receiving unit 417.

A third receiving unit 417 is configured to receive instruction information to instruct the host 41 to allocate the first USB interface to the first intelligent module 42. The instruction information may be a user instruction transmitted by a user or a request instruction transmitted by the first intelligent module 42.

Furthermore the switching unit 412 includes an allocating module 412a and a switching module 412b.

The allocating module 412a is configured to allocate the first USB interface to the first intelligent module 42 according to the instruction information and the interface identifier of the first USB interface.

The switching module 412b is configured, if there is no network channel between the host 41 and the first intelligent module 42, to establish a network channel between the host 41 and the first intelligent module 42 and to switch the first USB interface to the first intelligent module 42; or if there is a network channel between the host and the first intelligent module, to switch the first USB interface to the first intelligent module 42 directly over the network channel.

Optionally the switching unit 412 is configured:

If there is a network channel between the host 41 and some one of the at least one intelligent module 42, to determine the some one intelligent module 42 as the first intelligent module 42, to allocate the first USB interface directly to the first intelligent module 42 and to switch the first USB interface to the first intelligent module 42 over the network channel; or If there is no network channel between the host and any of the intelligent modules 42, to select one of the at least one intelligent module 42 as the first intelligent module 42, to allocate the first USB interface to the first intelligent module 42, and to establish a network channel between the host and the first intelligent module 42 and to further switch the first USB interface to the first intelligent module 42.

In the combo TV set according to the embodiments of the disclosure, the host receives the data packet transmitted via the first USB interface by the first USB device, parses the data packet and obtains the interface identifier of the first USB interface in the data packet, and switches the first USB interface to the first intelligent module corresponding to the first USB interface according to the interface identifier of the first USB interface, and then the host transmits the USB request to the first intelligent module over the network channel between the host and the first intelligent module, and the first intelligent module loads the corresponding USB device driver according to the device identifier of the first USB device included in the USB request to identify the first intelligent module, so that the USB device information may be shared in the combo TV set; and as compared with the prior art where the intelligent module in the combo TV set may not access directly the USB device connected with the host in the combo TV set, the inventive process above enables the intelligent module in the combo TV set to access successfully the USB device connected via the USB interface on the host to thereby improve the utilization ratio of the USB device and further satisfy a demand for sharing digitalized devices at home.

Figure 7:
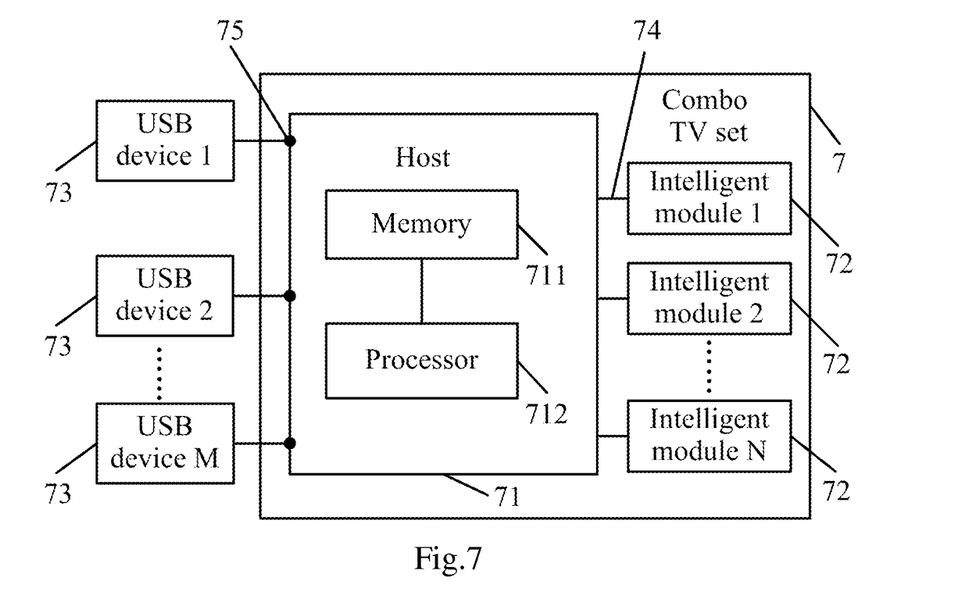
FIG. 7 illustrates a schematic structural diagram of another combo TV set according to an embodiment of the disclosure.

Some embodiments of the disclosure further provide a combo TV set. As illustrated in FIG. 7, the combo TV set 7 may include a host 71, and at least one intelligent module 72 (for example the intelligent component) connected with the host 71 over a network channel 74, and the host 71 may include at least one USB interface 75, the USB interface is configured to be connected with the USB device 73. The host 71 includes a memory 711 and one or more processors 712, the memory 711 stores one or more computer readable program codes, and the one or more processors 712 are configured to execute the one or more computer readable program codes to:

receive a data packet transmitted via a first USB interface by a first USB device;

parse the data packet and obtain an interface identifier of the first USB interface in the data packet;

switch the first USB interface to a first intelligent module corresponding to the first USB interface according to the interface identifier of the first USB interface; and transmit a USB request to the first intelligent module over a network channel between the host and the first intelligent module, so that the first intelligent module loads a corresponding USB device driver according to a device identifier of the first USB device comprised in the USB request to identify the first USB device.

In one embodiment, one or more processors 712 are further configured to execute the one or more computer readable program codes to:

receive a data request fed back by the first intelligent module, the data request is used to request data in the first USB device from the host; and obtain the data in the first USB device requested by the data request and map the data in the first USB device requested by the data request to the first intelligent module over the network channel.

In one embodiment, the one or more processors 712 are further configured to execute the one or more computer readable program codes to:

receive instruction information, the instruction information instructs the host to allocate the first USB interface to the first intelligent module, wherein the instruction information is a user instruction transmitted by a user or a request instruction transmitted by the first intelligent module; and switching the first USB interface to the first intelligent module corresponding to the first USB interface according to the interface identifier of the first USB interface comprises:

allocating the first USB interface to the first intelligent module according to the instruction information and the interface identifier of the first USB interface; and if there is no network channel between the host and the first intelligent module, then establishing a network channel between the host and the first intelligent module and switching the first USB interface to the first intelligent module; or if there is a network channel between the host and the first intelligent module, then switching the first USB interface to the first intelligent module directly over the network channel.

In one embodiment, the one or more processors 712 are further configured to execute the one or more computer readable program codes to:

receive instruction information, the instruction information instructs the host to allocate the first USB interface to the first intelligent module, wherein the instruction information is a user instruction transmitted by a user or a request instruction transmitted by the first intelligent module; and switching the first USB interface to the first intelligent module corresponding to the first USB interface according to the interface identifier of the first USB interface comprises:

allocating the first USB interface to the first intelligent module according to the instruction information and the interface identifier of the first USB interface; and if there is no network channel between the host and the first intelligent module, then establishing a network channel between the host and the first intelligent module and switching the first USB interface to the first intelligent module; or if there is a network channel between the host and the first intelligent module, then switching the first USB interface to the first intelligent module directly over the network channel.

In one embodiment, the switching the first USB interface to the first intelligent module corresponding to the first USB interface according to the interface identifier of the first USB interface comprises: if there is a network channel between the host and some one of the at least one intelligent module, then determining the some intelligent module as the first intelligent module, allocating the first USB interface directly to the first intelligent module and switching the first USB interface to the first intelligent module over the network channel; or if there is no network channel between the host and any of the intelligent modules, then selecting one of the at least one intelligent module as the first intelligent module, allocating the first USB interface to the first intelligent module, and establishing a network channel between the host and the first intelligent module and further switching the first USB interface to the first intelligent module.

Alternatively, the switching the first USB interface to the first intelligent module corresponding to the first USB interface according to the interface identifier of the first USB interface comprises: if there is a network channel between the host and some one of the at least one intelligent module, then determining the some intelligent module as the first intelligent module, allocating the first USB interface directly to the first intelligent module and switching the first USB interface to the first intelligent module over the network channel; or if there is no network channel between the host and any of the intelligent modules, then selecting one of the at least one intelligent module as the first intelligent module, allocating the first USB interface to the first intelligent module, and establishing a network channel between the host and the first intelligent module and further switching the first USB interface to the first intelligent module.

In the combo TV set provided by one or more embodiments, the USB device information may be shared in the combo TV set. As compared with the prior art where the intelligent module in the combo TV set may not access directly the USB device connected with the host of the combo TV set, the process above of the present disclosure enables the intelligent module in the combo TV set to access successfully the USB device connected via the USB interface of the host to thereby improve the utilization ratio of the USB device and further satisfy a demand for sharing digitalized devices at home.

In one embodiment, the interface identifier of the first USB interface comprises an interface number of the first USB interface; and the device identifier of the first USB device is used to identify a device type of the first USB device, the device type comprises a file system, an input system or an output system.

In another aspect, still another embodiment of the disclosure further provides a computer readable storage medium which may be a computer readable storage medium included in the memories in the embodiments above; or may be a separately existing computer readable storage medium which is not installed into the TV set. The computer readable storage medium stores therein one or more programs (in some embodiments, the computer readable storage medium may be one or more magnetic-disk storage devices, flash memory devices or other nonvolatile solid-state storage devices, CD-ROMs, optical memories, etc.), and the one or more programs may be executed by one or more processors to perform the USB sharing method above. For operations included in the method, reference may be made to the relevant description of the embodiments illustrated in FIG. 1 to FIG. 3, and a repeated description thereof will be omitted here.

In some embodiments, the combo TV set may be a TV device, of which the display function may be separated from the intelligent function, for example, the intelligent card with intelligent function may be separated from the host of the TV device with display function, and the intelligent card may be inserted into the host to form the combo TV set which may implement the intelligent function.

Those skilled in the art may readily appreciate that the respective function modules have been described above for the sake of convenience and conciseness, but in a practical application, the functions above may be allocated to the different function modules as needed, that is, the internal structure of the devices may be divided into the different function modules for performing all or a part of the functions described above. Reference may be made to the corresponding processes in the embodiments of the methods described earlier for particular operation processes of the system, the devices and the units described above, so a repeated description thereof will be omitted here.

In the several embodiments of the disclosure, it shall be appreciated that the disclosed devices and the methods may be embodied otherwise. For example the embodiments of the devices described above are merely illustrative, for example, the devices have been just divided into the modules or the units in terms of their logical functions but may be divided otherwise in a real implementation, for example, more than one of the units or the components may be combined or may be integrated into another system, or some of the features may be ignored or may not be implemented. Furthermore the illustrated or described coupling or direct coupling or communication connection between the units or the components may be established via some interfaces, or direct coupling or communication connection between them.

Moreover the respective function units in the respective embodiments of the disclosure may be integrated into one processing unit or the respective function units may be physically embodied separately or two or more of the units may be integrated in one unit. The integrated units may be embodied in the form of hardware or may be embodied in the form of software function units.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A USB sharing method for a combo TV set, the combo TV set comprising a host and at least one intelligent component connected with the host over a network channel, the host comprising at least one USB interface configured to be connected with a USB device, the method comprising:
   receiving, by the host, a data packet transmitted via a first USB interface by a first USB device;
   parsing the data packet and obtaining an interface identifier of the first USB interface in the data packet;
   switching the first USB interface to a first intelligent component corresponding to the first USB interface according to the interface identifier of the first USB interface; and
   transmitting a USB request to the first intelligent component over a network channel between the host and the first intelligent component, so that the first intelligent component installs a corresponding USB device driver on the first intelligent component according to a device identifier of the first USB device comprised in the USB request to identify the first USB device.

2. The method according to claim 1, wherein the method further comprises:
   receiving, by the host, a data request fed back by the first intelligent component, the data request used to request data in the first USB device from the host; and
   obtaining the data in the first USB device requested by the data request and mapping the data in the first USB device requested by the data request to the first intelligent component over the network channel.

3. The method according to claim 1, wherein before switching the first USB interface to the first intelligent component corresponding to the first USB interface according to the interface identifier of the first USB interface, the method further comprises:
   receiving instruction information, the instruction information instructing the host to allocate the first USB interface to the first intelligent component, wherein the instruction information is a user instruction transmitted by a user or a request instruction transmitted by the first intelligent component; and
   switching the first USB interface to the first intelligent component corresponding to the first USB interface according to the interface identifier of the first USB interface comprises:
   allocating the first USB interface to the first intelligent component according to the instruction information and the interface identifier of the first USB interface; and
   if there is no network channel between the host and the first intelligent component, then establishing the network channel between the host and the first intelligent component and switching the first USB interface to the first intelligent component; or if there is the network channel between the host and the first intelligent component, then switching the first USB interface to the first intelligent component directly over the network channel.

4. The method according to claim 1, wherein switching the first USB interface to the first intelligent component corresponding to the first USB interface according to the interface identifier of the first USB interface comprises:
   if there is a network channel between the host and one of the at least one intelligent component, then determining said one intelligent component as the first intelligent component, allocating the first USB interface directly to the first intelligent component and switching the first USB interface to the first intelligent component over the network channel; or
   if there is no network channel between the host and any of the intelligent components, then selecting one of the at least one intelligent component as the first intelligent component, allocating the first USB interface to the first intelligent component, and establishing the network channel between the host and the first intelligent component and further switching the first USB interface to the first intelligent component.

5. The method according to claim 1, wherein the interface identifier of the first USB interface comprises an interface number of the first USB interface; and the device identifier of the first USB device is used to identify a device type of the first USB device, the device type comprises a file system, an input system or an output system.

6. The method according to claim 2, wherein before switching the first USB interface to the first intelligent component corresponding to the first USB interface according to the interface identifier of the first USB interface, the method further comprises:
receiving instruction information, the instruction information instructing the host to allocate the first USB interface to the first intelligent component, wherein the instruction information is a user instruction transmitted by a user or a request instruction transmitted by the first intelligent component; and
switching the first USB interface to the first intelligent component corresponding to the first USB interface according to the interface identifier of the first USB interface comprises:
allocating the first USB interface to the first intelligent component according to the instruction information and the interface identifier of the first USB interface; and
if there is no network channel between the host and the first intelligent component, then establishing the network channel between the host and the first intelligent component and switching the first USB interface to the first intelligent component; or if there is the network channel between the host and the first intelligent component, then switching the first USB interface to the first intelligent component directly over the network channel.

7. The method according to claim 2, wherein switching the first USB interface to the first intelligent component corresponding to the first USB interface according to the interface identifier of the first USB interface comprises:
if there is a network channel between the host and one of the at least one intelligent component, then determining said one intelligent component as the first intelligent component, allocating the first USB interface directly to the first intelligent component and switching the first USB interface to the first intelligent component over the network channel; or
if there is no network channel between the host and any of the intelligent components, then selecting one of the at least one intelligent component as the first intelligent component, allocating the first USB interface to the first intelligent component, and establishing the network channel between the host and the first intelligent component and further switching the first USB interface to the first intelligent component.

8. A combo TV set comprising a host and at least one intelligent component connected with the host over a network channel, the host comprising at least one USB interface configured to be connected with a USB device, a memory and one or more processors, the memory storing one or more computer readable program codes, and the one or more processors configured to execute the one or more computer readable program codes to:
receive a data packet transmitted via a first USB interface by a first USB device;
parse the data packet and obtain an interface identifier of the first USB interface in the data packet;
switch the first USB interface to a first intelligent component corresponding to the first USB interface according to the interface identifier of the first USB interface; and
transmit a USB request to the first intelligent component over a network channel between the host and the first intelligent component, so that the first intelligent component installs a corresponding USB device driver on the first intelligent device according to a device identifier of the first USB device comprised in the USB request to identify the first USB device.

9. The combo TV set according to claim 8, wherein the one or more processors are further configured to execute the one or more computer readable program codes to:
receive a data request fed back by the first intelligent component, the data request used to request data in the first USB device from the host; and
obtain the data in the first USB device requested by the data request and map the data in the first USB device requested by the data request to the first intelligent component over the network channel.

10. The combo TV set according to claim 8, wherein the one or more processors are further configured to execute the one or more computer readable program codes to:
receive instruction information, the instruction information instructing the host to allocate the first USB interface to the first intelligent component, wherein the instruction information is a user instruction transmitted by a user or a request instruction transmitted by the first intelligent component; and
switching the first USB interface to the first intelligent component corresponding to the first USB interface according to the interface identifier of the first USB interface comprises:
allocating the first USB interface to the first intelligent component according to the instruction information and the interface identifier of the first USB interface; and
if there is no network channel between the host and the first intelligent component, then establishing the network channel between the host and the first intelligent component and switching the first USB interface to the first intelligent component; or if there is the network channel between the host and the first intelligent component, then switching the first USB interface to the first intelligent component directly over the network channel.

11. The combo TV set according to claim 8, wherein switching the first USB interface to the first intelligent component corresponding to the first USB interface according to the interface identifier of the first USB interface comprises:
if there is a network channel between the host and one of the at least one intelligent component, then determining said one intelligent component as the first intelligent component, allocating the first USB interface directly to the first intelligent component and switching the first USB interface to the first intelligent component over the network channel; or
if there is no network channel between the host and any of the intelligent components, then selecting one of the at least one intelligent component as the first intelligent component, allocating the first USB interface to the first intelligent component, and establishing the network channel between the host and the first intelligent component and further switching the first USB interface to the first intelligent component.

12. The combo TV set according to claim 8, wherein the interface identifier of the first USB interface comprises an interface number of the first USB interface; and the device identifier of the first USB device is used to identify a device type of the first USB device, the device type comprises a file system, an input system or an output system.

13. The combo TV set according to claim 9, wherein the one or more processors are further configured to execute the one or more computer readable program codes to:
receive instruction information, the instruction information instructing the host to allocate the first USB interface to the first intelligent component, wherein the instruction information is a user instruction transmitted by a user or a request instruction transmitted by the first intelligent component; and
switching the first USB interface to the first intelligent component corresponding to the first USB interface according to the interface identifier of the first USB interface comprises:
allocating the first USB interface to the first intelligent component according to the instruction information and the interface identifier of the first USB interface; and
if there is no network channel between the host and the first intelligent component, then establishing the network channel between the host and the first intelligent component and switching the first USB interface to the first intelligent component; or if there is the network channel between the host and the first intelligent component, then switching the first USB interface to the first intelligent component directly over the network channel.

14. The combo TV set according to claim 9, wherein switching the first USB interface to the first intelligent component corresponding to the first USB interface according to the interface identifier of the first USB interface comprises:
if there is a network channel between the host and one of the at least one intelligent component, then determining said one intelligent component as the first intelligent component, allocating the first USB interface directly to the first intelligent component and switching the first USB interface to the first intelligent component over the network channel; or
if there is no network channel between the host and any of the intelligent components, then selecting one of the at least one intelligent component as the first intelligent component, allocating the first USB interface to the first intelligent component, and establishing the network channel between the host and the first intelligent component and further switching the first USB interface to the first intelligent component.

15. A non-transitory computer readable storage medium applicable to a combo TV set comprising a host and at least one intelligent component connected with the host over a network channel, the host comprising at least one USB interface configured to be connected with a USB device, wherein the computer readable storage medium stores thereon instruction codes where when the instruction codes are executed, enable the host to:
receive a data packet transmitted via a first USB interface by a first USB device;
parse the data packet and obtaining an interface identifier of the first USB interface in the data packet;
switch the first USB interface to a first intelligent component corresponding to the first USB interface according to the interface identifier of the first USB interface; and
transmit a USB request to the first intelligent component over a network channel between the host and the first intelligent component, so that the first intelligent component installs a corresponding USB device driver on the first intelligent component according to a device identifier of the first USB device comprised in the USB request to identify the first USB device.

16. The non-transitory computer readable storage medium according to claim 15, wherein the instruction codes are executed to further enable the host to perform:
receiving a data request fed back by the first intelligent component, the data request used to request data in the first USB device from the host; and
obtaining the data in the first USB device requested by the data request and mapping the data in the first USB device requested by the data request to the first intelligent component over the network channel.

17. The non-transitory computer readable storage medium according to claim 15, wherein the instruction codes are executed to further enable the host to perform:
receiving instruction information, the instruction information instructing the host to allocate the first USB interface to the first intelligent component, wherein the instruction information is a user instruction transmitted by a user or a request instruction transmitted by the first intelligent component; and
switching the first USB interface to the first intelligent component corresponding to the first USB interface according to the interface identifier of the first USB interface comprises:
allocating the first USB interface to the first intelligent component according to the instruction information and the interface identifier of the first USB interface; and
if there is no network channel between the host and the first intelligent component, then establishing a network channel between the host and the first intelligent component and switching the first USB interface to the first intelligent component; or if there is the network channel between the host and the first intelligent component, then switching the first USB interface to the first intelligent component directly over the network channel.

18. The non-transitory computer readable storage medium according to claim 15, wherein the instruction codes are executed to further enable the host to perform:
if there is a network channel between the host and one of the at least one intelligent component, then determining said one intelligent component as the first intelligent component, allocating the first USB interface directly to the first intelligent component and switching the first USB interface to the first intelligent component over the network channel; or
if there is no network channel between the host and any of the intelligent components, then selecting one of the at least one intelligent component as the first intelligent component, allocating the first USB interface to the first intelligent component, and establishing the network channel between the host and the first intelligent component and further switching the first USB interface to the first intelligent component.

19. The non-transitory computer readable storage medium according to claim 15, wherein the interface identifier of the first USB interface comprises an interface number of the first USB interface; and the device identifier of the first USB device is used to identify a device type of the first USB device, the device type comprises a file system, an input system or an output system.

20. The non-transitory computer readable storage medium according to claim 16, wherein the instruction codes are executed to further enable the host to perform:
- receiving instruction information, the instruction information instructing the host to allocate the first USB interface to the first intelligent component, wherein the instruction information is a user instruction transmitted by a user or a request instruction transmitted by the first intelligent component; and
- switching the first USB interface to the first intelligent component corresponding to the first USB interface according to the interface identifier of the first USB interface comprises:
- allocating the first USB interface to the first intelligent component according to the instruction information and the interface identifier of the first USB interface; and
- if there is no network channel between the host and the first intelligent component, then establishing the network channel between the host and the first intelligent component and switching the first USB interface to the first intelligent component; or if there is the network channel between the host and the first intelligent component, then switching the first USB interface to the first intelligent component directly over the network channel.

* * * * *